United States Patent Office
3,274,239
Patented Sept. 20, 1966

3,274,239
FLUOROCARBON ETHERS
Stanley Selman, Wilmington, Del., assignor to E. I. du Pont de Nemours and Company, Wilmington, Del., a corporation of Delaware
No Drawing. Filed Aug. 31, 1962, Ser. No. 220,858
6 Claims. (Cl. 260—514)

The present invention relates to novel fluorocarbon ethers and a method for their preparation. More particularly, the present invention relates to fluorocarbon ether acids and acid derivatives.

The fluorocarbon ethers of the present invention have the general formulae

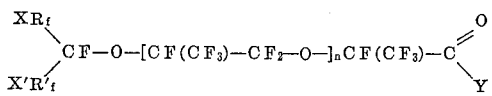

and

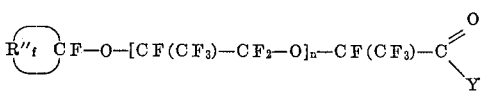

where $R_f$ and $R'_f$ are perfluoroalkylene radicals having from one to eight carbon atoms, $R''_f$ is a perfluoroalkylene radical of three to eight carbon atoms, and X and X' are radicals selected from the group consisting of hydrogen and halogen, $n$ is an integer from zero to twenty inclusive, and —COY is the carboxylic acid group or a carboxylic acid derivative group.

The fluorocarbon ethers of the present invention are prepared by the reaction of hexafluoropropylene epoxide,

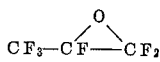

with fluorinated ketones having the structures $$XR_f\text{—CO—}R'_fX'$$

and

where $R_f$, $R'_f$, $R''_f$, X and X' have the meaning indicated above.

Fluorinated ketones which form the fluorocarbon ethers of the present invention are known in the art. Hexafluoropropylene epoxide is obtained by the oxidation of hexafluoropropylene using aqueous alkaline hydrogen peroxide.

The reaction of the hexafluoropropylene epoxide with the fluorinated ketone is carried out in a polar organic solvent. Suitable solvents are organic solvents liquid at the reaction temperature and capable of dissolving, i.e., to an extent of greater than 0.1 weight percent, perfluorocarbon alkoxides of alkali metals and specifically potassium perfluoropropoxide. The alkoxides can be formed by reaction of metal fluorides with perfluoroacyl fluorides. In particular, however, the preferred organic solvents are aliphatic polyethers having from 4 to 10 carbon atoms and hydrocarbon nitriles having from 2 to 10 carbon atoms, such as the dimethyl ether of ethylene glycol, the dimethyl ether of diethylene glycol, dioxane, propionitrile, benzonitrile and acetonitrile. Other highly polar solvents which meet the foregoing qualifications but which are not nitriles nor polyethers include dimethyl sulfoxide, N-methyl pyrrolidone, nitroethane and tetrahydrofuran.

The catalysts suitable for the reaction of the hexafluoropropylene epoxides with the fluorinated ketones are the alkali metal fluorides, quaternary ammonium fluorides and silver fluoride. The fluorides may be used as such or admixed with other alkali metal halides. Such mixtures are, for example, mixtures of LiCl-CsF, LiCl-KF and LiBr-KF. Catalyst concentration is not critical and amounts of catalyst are determined by the environment in which the reaction is carried out. In general, the concentration of the catalyst is at least 0.01% by weight of the hexafluoropropylene epoxide. The catalyst may be present either in solution or as a separate phase.

Reaction temperatures may be greatly varied from −80° to 200° C., although a preferred range is from −30° to 100° C. Pressures ranging from below atmospheric pressure to several hundred atmospheres have been employed and it has been established that pressure is not a critical factor in the process described. Pressure is primarily employed for convenience depending on the physical properties of the reactants at any selected reaction temperature. As indicated in the foregoing general formula of the novel fluorocarbon ethers of the present invention, the product obtained by the reaction of a fluorinated ketone with hexafluoropropylene epoxide may be an addition product of the ketone and the epoxide or may be a polyether comprising a hexafluoropropylene epoxide polymer chain bonded to a fluorinated ketone through the carbonyl oxygen. The degree of polymerization obtained depends on the reaction temperature and the ratio of the epoxide to the ketone. At high temperatures, a lower degree of polymerization is obtained than at lower temperatures. However, the reaction is more strongly affected by the ratio of reactants. Thus, at ratios of 1:1, substantially only the addition product is formed. As the ratio of the epoxide to the ketone is increased products with higher degrees of polymerization are obtained. It is, however, to be realized that this control over the nature of the fluorocarbon ethers obtained by the process of the present invention is not absolute and does not prevent the formation of some fluorocarbon ethers of either higher or lower molecular weight or both.

Florinated ketones suitable in the formation of the described fluorocarbon ethers are hexafluoroacetone, perfluorodiethyl ketone, perfluorodibutyl ketone, chlorodifluoromethyl ketone, 1,1,3,3-tetrafluoroacetone, di-2-hydroperfluoroethyl ketone, perfluorocyclobutanone and perfluorocyclopentanone. The preferred class of fluorinated ketones employed in the process of the present invention comprise perfluorodialkyl ketones and perfluorocycloketones.

The process of the present invention is further illustrated by the following examples.

Example I

Into a dry, 180 ml. stainless steel tube, previously flushed with nitrogen, is placed 28 g. of cesium fluoride and 28 g. of diethylene glycol dimethyl ether. The tube is closed, cooled to −80° C. and evacuated. Hexafluoroacetone, 50 g. is then charged into the tube followed by 50 g. of hexafluoropropylene epoxide. The tube is then heated with agitation under autogenous pressure at 50° C. for 3 hrs. and then at 80° C. for 3 hours. After separation from the reaction medium and removal of the catalyst by filtration, the product is distilled and results in a 50% yield of perfluoro-2-isopropoxypropionyl fluoride, B.P. 57° C. at atmospheric pressure.

The acid fluoride is converted to the acid by adding water to the acid fluoride; neutralization of the resulting acid with 10 N KOH results in the formation of the potassium salt of perfluoro-2-isopropoxypropionic acid.

The perfluoro-2-isopropoxypropionyl fluoride is dehalocarbonylated by passage through a bed of dry potassium sulfate pellets at 300° C. with a contact time of 10 minutes. The major product isolated is perfluoroisopropyl perfluorovinyl ether, B.P. 35° C.

Ammonia is passed through an aqueous solution of perfluoro-2-isopropoxypropionic acid at room temperature for 30 minutes. On evaporation of the water, there is obtained the perfluoro-2-isopropoxypropionamide.

*Example II*

The reaction of hexafluoropropylene epoxide and hexafluoroacetone described in Example I is repeated except that 10 g. of hexafluoroacetone and 50 g. of hexafluoropropylene epoxide is employed. The resulting product has the formula

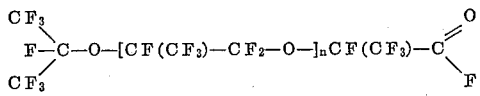

where $n$ varies from 1 to 6.

*Example III*

The reaction described in Example I is repeated except that 1,3-dihydroperfluoroacetone is employed instead of the hexafluoroacetone. The product obtained on workup is 1,3-dihydroperfluoroisopropoxy-2-perfluoropropionyl fluoride.

*Example IV*

The reaction described in Example I is repeated except that 17.8 g. of perfluorocyclobutanone and 83 g. of hexafluoropropylene epoxide are employed. On distillation of the product there is obtained a mixture of the 1:1 adduct of perfluorocyclobutanone with hexafluoropropylene epoxide of the structure

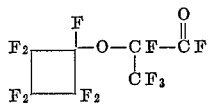

having a boiling point of 85–88° C. together with higher molecular weight products of the structure

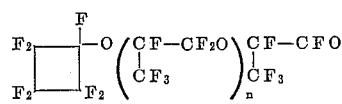

where $n$ varies from 1 to 6.

*Example V*

The reaction described in Example I is repeated except that 22.8 g. of perfluorocyclopentanone and 83 g. of hexafluoropropylene epoxide are employed. On distillation of the product there is obtained a mixture of the 1:1 adduct of perfluorocyclopentanone with hexafluoropropylene epoxide of the structure

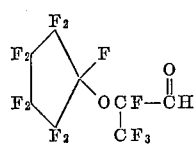

having a boiling point of 110–113° C. together with higher molecular weight products of the structure

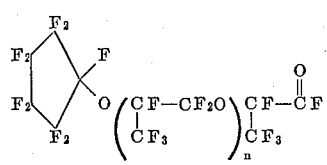

where $n$ varies from 1 to 6.

*Example VI*

The reaction described in Example I is repeated except that 2.7 g. of perfluoro-2-pentanone and 8.3 g. of hexafluoropropylene epoxide are employed. On distillation of the product there is obtained a mixture of the 1:1 adduct of perfluoro-2-pentanone and hexafluoropropylene epoxide of the structure

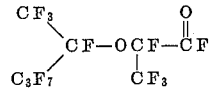

having a boiling point of 114–117° C. together with higher molecular weight products of the structure

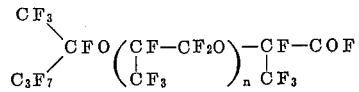

where $n$ varies from 1 to 6.

The acid fluorides formed by the reaction of the fluorinated ketone with hexafluoropropylene epoxide in accordance with the present invention are readily hydrolyzed to the acids which have the general formulae

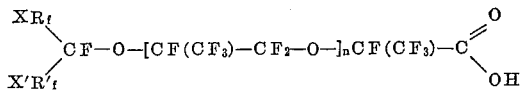

and

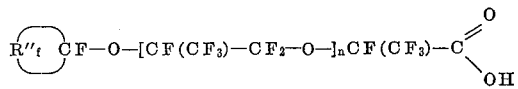

where X, $R_f$, X', $R'_f$, $R''_f$ and $n$ have the same meaning as above. The chemical reactivity of the fluorocarbon ether acids defined by the foregoing formulae, with regard to the carboxylic acid group —COY is analogous to that of perfluorocarboxylic acid having the same number of carbon atoms. Thus, as illustrated, the acids react with bases to form the corresponding salts. The acids can also be reacted with phosphorus pentachloride to result in the corresponding acid chlorides. The acid chlorides can be reacted with alcohols to form the corresponding esters. Primary alcohols can be directly reacted with the acids to form the corresponding esters. Other derivatives that can be formed in accordance with techniques developed for other fluorocarbon acids include amides, nitriles, etc.

The ether acid compounds of the present invention, however, have one characteristic property which makes them extremely useful and which distinguishes them from acids of similar structure, and, particularly, perfluoropropionic acids containing perfluoroalkoxy groups in the three position. The acid compounds of the present invention in the form of the acid fluorides or in the form of the alkali metal salt of the acid can be decarboxylated to form perfluorovinyl ethers which are extremely useful monomers in the formation of high molecular weight fluorocarbon polymers, while the alkali metal salts or acid fluorides of 3-perfluoroalkoxypropionic acid fluorides are stable and do not result in the formation of vinyl ethers. Thus, alkali metal salts of the acids of the present invention when heated to 170 to 250° C. decarboxylate to give the vinyl ethers. The same salts of the 3-perfluoroalkoxypropionic acids are stable up to 200° C. and thereafter decompose by a reaction which results in the formation of tetrafluoroethylene and products other than vinyl ethers.

In addition to their utility as intermediates in the formation of polymerizable vinyl ethers, the fluorocarbon ether acids and salts of the present invention are also extremely useful dispersing agents which are chemically inert and thermally stable.

I claim:
1. A fluorocarbon ether compound having the general formula

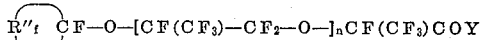

where $R''_f$ is a perfluoroalkylene group of three to eight carbons, $n$ is an integer from zero to twenty inclusive and Y is a group selected from the class consisting of the hydroxyl and the fluorine group.

2. The fluorocarbon ether compound of claim 1 wherein the $R''_f$ is a perfluorotrimethylene group.

3. The fluorocarbon ether compound of claim 1 wherein $R''_f$ is a perfluorotetramethylene group.

4. A process for the preparation of fluorocarbon ethers which comprises reacting a ketone selected from the class consisting of ketones having the formula $XR_fCOR'_fX'$ and

wherein $R_f$ and $R'_f$ are perfluoroalkylene radicals of one to 8 carbons, $R''_f$ is a perfluoroalkylene radical of 3 to 8 carbon atoms and X and X' are radicals selected from the class consisting of hydrogen and halogen, with hexafluoropropylene epoxide at a temperature of −80 to 200° C., in a polar organic solvent capable of dissolving at least 0.1 weight percent of potassium perfluoropropoxide and containing a catalyst, in a concentration of at least 0.01 weight percent based on the hexafluoropropylene epoxide, selected from the class consisting of alkali metal fluorides and quaternary ammonium fluorides.

5. The process of claim 4 wherein the polar organic solvent is an aliphatic polyether having from 4 to 10 carbon atoms.

6. The process of claim 4 wherein the polar organic solvent is a hydrocarbon nitrile of 2 to 10 carbon atoms.

References Cited by the Examiner
UNITED STATES PATENTS

| 2,713,593 | 7/1955 | Brice | 260—535 |
| 2,839,513 | 6/1958 | Ahlbrecht | 260—535 X |
| 3,114,778 | 12/1963 | Fritz et al. | 260—544 X |
| 3,213,062 | 10/1965 | Ellingboe et al. | 260—544 X |

LORRAINE A. WEINBERGER, *Primary Examiner.*

LEON ZITVER, *Examiner.*

D. P. CLARKE, R. K. JACKSON,
*Assistant Examiners.*